April 24, 1951     J. N. WOOLRICH     2,550,512
BRAZING PROCESS
Filed May 11, 1948
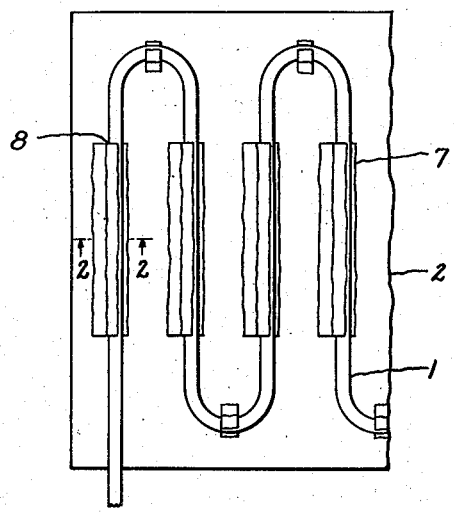
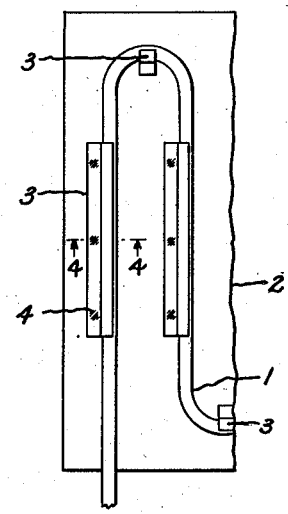
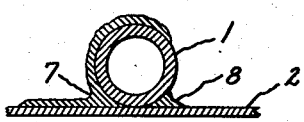
Inventor:
James N. Woolrich,
by *Abraham Cohen*
His Attorney.

Patented Apr. 24, 1951

2,550,512

UNITED STATES PATENT OFFICE 2,550,512

BRAZING PROCESS

James N. Woolrich, Erie, Pa., assignor to General Electric Company, a corporation of New York Application May 11, 1948, Serial No. 26,295

1 Claim. (Cl. 113—112)

This invention relates to the brazing of metal parts. More particularly it relates to improvements in the brazing of shaped metal sections to metal sheets or other metallic backing material.

An object of the present invention is to provide a simple means of brazing shaped metal sections to other metallic material.

Another object of this invention is to provide a simple means of fabricating articles which comprise shaped sections brazed to other metal structures.

A further object is to provide a method of brazing shaped metal sections to metal sheet wherein the means employed for temporarily securing the sections to the sheet prior to brazing is comprised of the brazing material later used to braze the sections to the sheet.

Other objects will become apparent and the invention will be better understood from a consideration of the following description, the claim appended hereto in which the features of invention are specifically pointed out, and the drawing in which Fig. 1 is a plan view of a metal sheet with a shaped section brazed in place; Fig. 2 is a sectional elevation view in the direction 2—2 of a metal section after brazing; Fig. 3 is a plan view of a metal sheet with a shaped section clamped in place prior to brazing; and Fig. 4 is a sectional elevation view in the direction 4—4 of a metal section before brazing showing the clamping material in place.

In the past various methods have been used in brazing shaped metal sections to other metal structures. For example, the material to which the section is to be brazed has been coated with a heat fusible alloy which, when the section is placed adjacent thereto and the whole heated, will fuse and braze the section to the backing material. In other instances the brazing material has been placed between the section and the sheet in the manner of shims which fuse under heat to form a fillet between the tubing and metallic backing. In still another method a heat fusible alloy coating on the section melts and brazes the section to the other structure. In all of these prior art methods some other means such as metal clamps must be employed to hold the tubing in place prior to brazing, this means being either left in place or removed after brazing.

According to the present invention there is provided a method of brazing shaped metal sections to other metal structures wherein the devices or clamps used to hold the sections in place prior to brazing are the source of the brazing material or alloy.

More specifically there is provide in this invention a method of brazing shaped metal sections or parts to another metal structure or part wherein the clamps used to hold the sections in place prior to brazing consist of pieces of the brazing alloy one edge portion of each of which is spot welded to the base structure, the other edge portion engaging the sections before brazing to hold them in place. The clamps so formed fuse under the heat of brazing to braze the sections in place.

Reference may be had to the drawing for an explanation of the operation of the present invention in brazing a piece of shaped metal section in the form of a tubing 1 to a metal sheet 2. Clamp-shaped pieces 3 of brazing material bent to conform to the contour of the shaped section 1 are fixed to sheet 2 as shown at 4, for example by spot welding, the pieces 3 being placed at all points where brazing is desired. The pieces 3 of brazing material may be of any length required as shown in Fig. 3 to conform to the contours of the section layout. The pieces 3 of brazing material also assist in locating the section 1 properly with respect to sheet or structure 2. The entire assembly of sheet section 2 and clamping pieces 3 is then placed in a brazing furnace with the sheet downward and heated to a temperature which will fuse the clamping pieces and form fillets 7 and 8 brazing the tubing to the sheet. If it is desired to braze section 1 along its entire length to the sheet, clamping piece 3 may be extended in length along the entire length of the section 1.

If the parts are cleaned prior to heating, the brazing may be carried out without the use of flux when a reducing furnace atmosphere is maintained. If the brazing is carried out in air the points of contact between the shaped section and the structure should be fluxed to reduce oxides.

What I claim as new and desire to secure by Letters Patent of the United States is:

The process of joining metal tubing to a metal sheet which comprises (1) placing the tubing in contact relationship with the metal sheet, (2) applying to the said tubing and sheet a clamp consisting of brazing material and which has a curved section conforming to the shape of the tube and a flattened portion coplanarly extensive with the metal sheet and contacting both the tubing and metal sheet, (3) spot-welding the clamp to the aforesaid sheet, and (4) thereafter heating the total assembly to fuse the brazing material comprising said clamp thereby to braze said tubing and metal sheet together.

JAMES N. WOOLRICH.

REFERENCES CITED

The following references are of record in the file of this patent:

UNITED STATES PATENTS

| Number | Name | Date |
|---|---|---|
| 1,276,426 | Slimp | Aug. 20, 1918 |
| 1,698,360 | Day | Jan. 8, 1929 |
| 2,151,206 | Hawthorn | Mar. 21, 1939 |

OTHER REFERENCES

Product Engineering (Oct. 1946) p. 104, Fig. 4.